Jan. 8, 1924.
M. B. LLOYD
1,479,823
MEANS FOR PRODUCING REED ARTICLES
Filed July 13, 1921          4 Sheets-Sheet 1
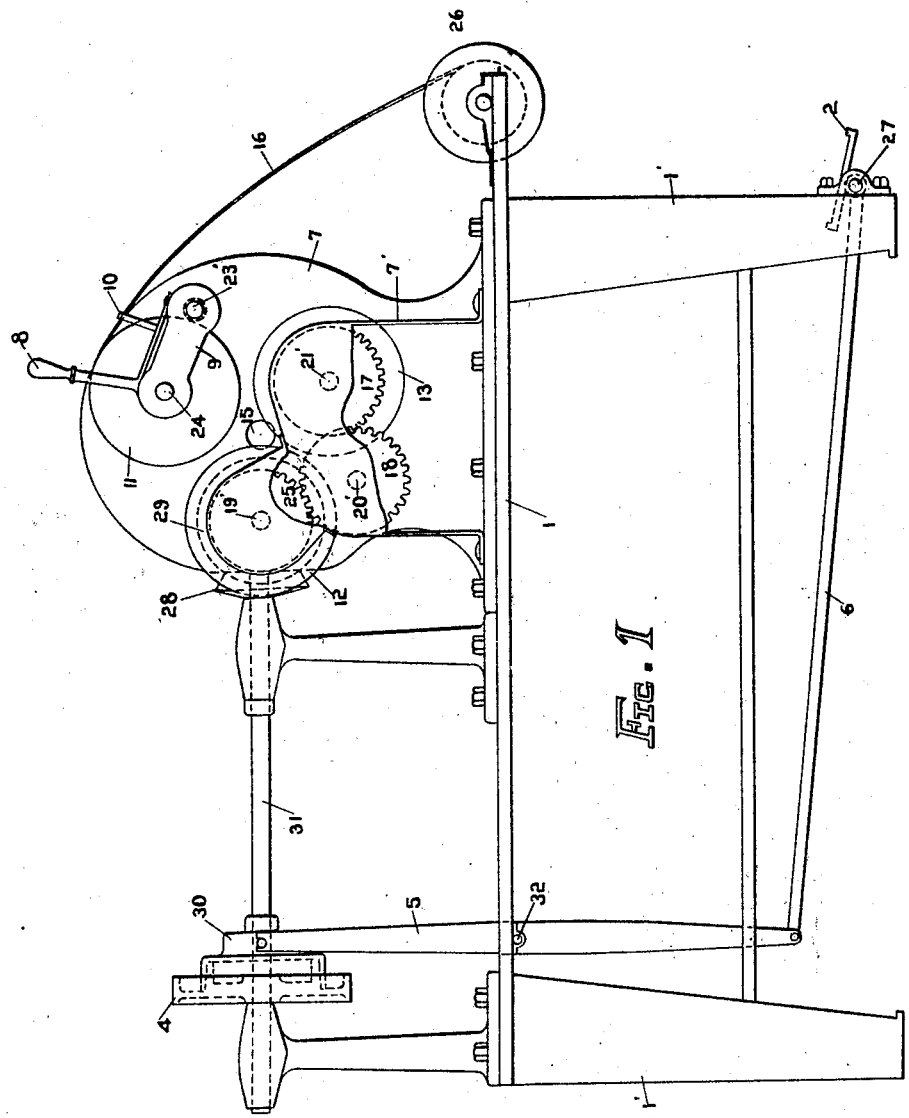
INVENTOR.
Marshall B. Lloyd
BY Arthur W Nelson
ATTORNEY

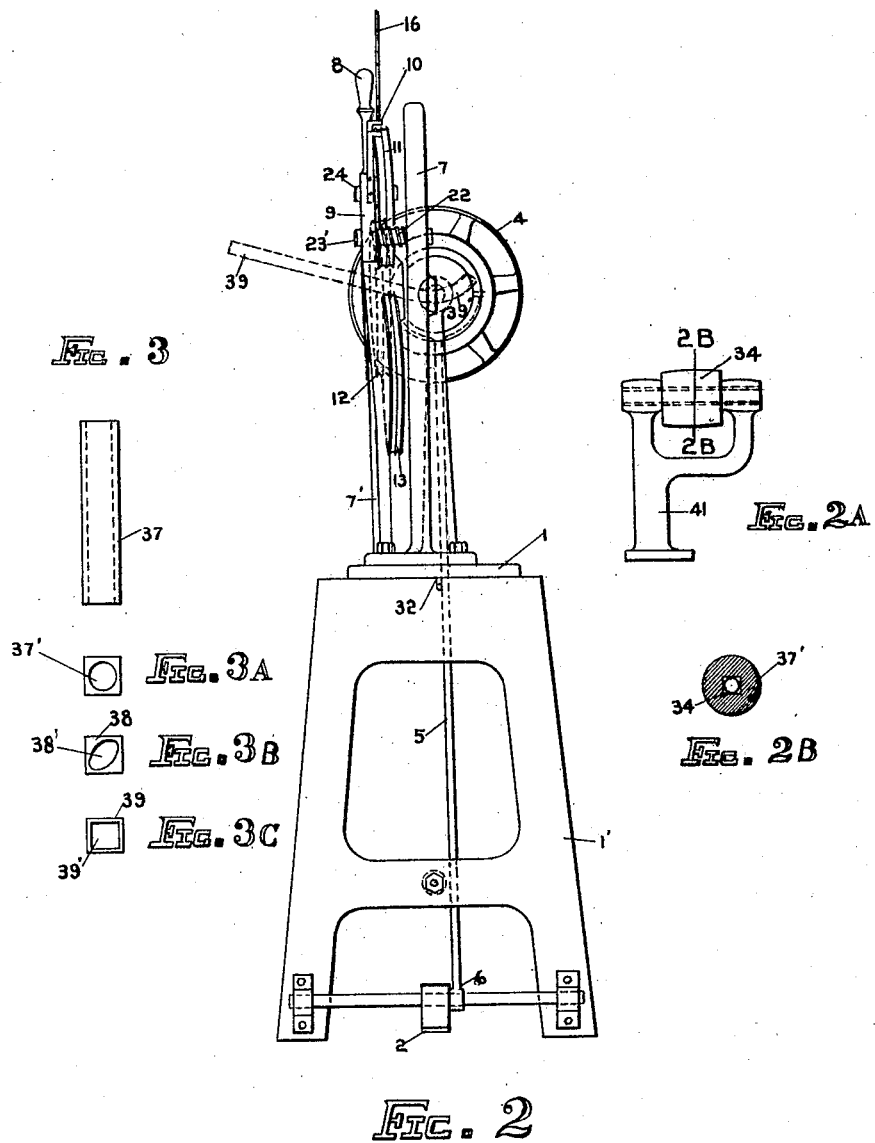

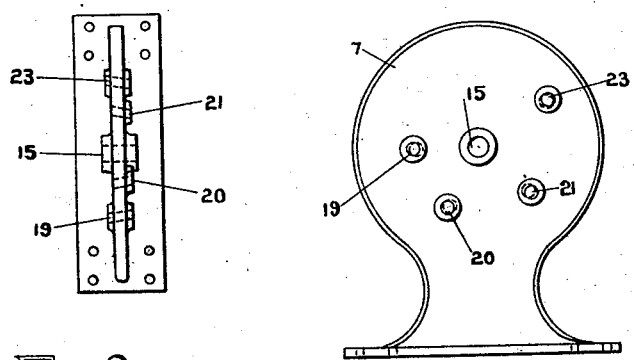
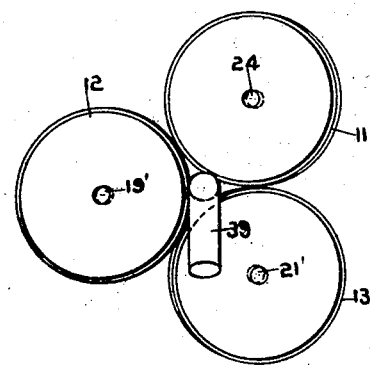
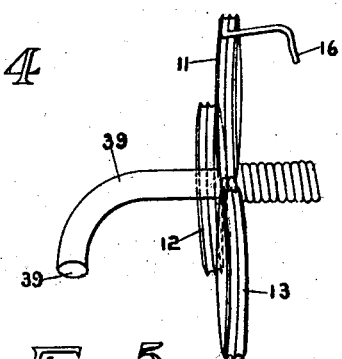
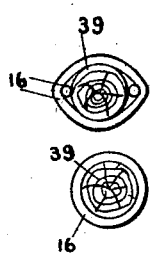
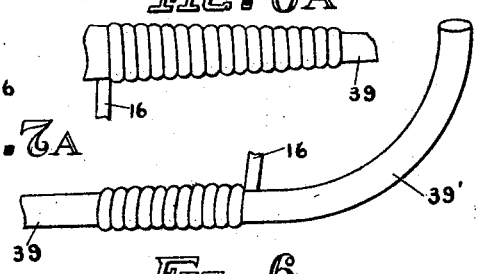

Jan. 8, 1924.

M. B. LLOYD 1,479,823

MEANS FOR PRODUCING REED ARTICLES

Filed July 13, 1921     4 Sheets-Sheet 4

INVENTOR.
Marshall B. Lloyd
BY Arthur W. Nelson
ATTORNEY

Patented Jan. 8, 1924.

1,479,823

UNITED STATES PATENT OFFICE.

MARSHALL B. LLOYD, OF MENOMINEE, MICHIGAN, ASSIGNOR TO HEYWOOD-WAKEFIELD COMPANY, OF BOSTON, MASSACHUSETTS, A CORPORATION OF MASSACHUSETTS.

MEANS FOR PRODUCING REED ARTICLES.

Application filed July 13, 1921. Serial No. 484,396.

*To all whom it may concern:*

Be it known that I, MARSHALL B. LLOYD, a citizen of the United States, and a resident of Menominee, county of Menominee, and State of Michigan, have invented a certain new, useful, and Improved Means for Producing Reed Articles, of which the following is a specification.

Cross reference is hereby made to applicant's pending divisional application, Serial No. 661,213, filed September 6, 1923, which claims certain of the subject-matter herein disclosed, but not claimed.

In the manufacture of reed articles, i. e., articles composed of a frame and a fabric of woven reed or similar material, the construction is frequently such that certain parts of the frame are not covered by the woven fabric, which would leave the frame portions exposed to view. This is not generally desired because it detracts from the artistic character of the article, and it has heretofore been customary, to cover exposed frame portions with reed strands or some reed-like material, such for example as the so-called fibre reed. This was accomplished by the workman winding or wrapping the strands manually around such portions of the frame as were to be covered. It should also be understood that this wrapping operation was done upon the assembled or completed frame of the article. Thus the workman not only was required manually to wrap or wind the strands upon the frame but such operation was encumbered and impeded by the very bulky and awkward character of the frame itself. As a result the winding or wrapping of the parts of the frame, not to be covered by the woven fabric, was a slow and laborious task that resulted in adding very greatly to the ultimate production cost of such articles.

The general object of my invention is to simplify, cheapen, and improve the manufacture of reed and reed-like articles.

A further object of my invention is to provide a method of producing reed articles, having a frame, wherewith it shall be possible to eliminate the hitherto hand wrapping of the frame portions with reed-like strands and to employ in lieu thereof a simple, inexpensive and efficient mechanism for that purpose.

Another object of my invention is to provide simple, efficient, and inexpensive means wherewith to assist in the practice of the method above outlined.

My invention consists generally in the steps, acts, and stated sequence thereof, and in the mechanism for practising the same whereby the above named objects, and others which will appear hereinafter are attained, all of which will be more readily understood by reference to the accompanying drawings illustrating, what I consider at the present time, to be the preferred embodiment thereof.

In said drawings:

Fig. 1 is an end elevation of a machine embodying my invention for winding reed-like strands upon members that are to form part of the article frame.

Fig. 2 is a right hand end elevation of the machine shown in Fig. 1.

Fig. 2$^A$ illustrates feeding mechanism such as is used when non-circular stock is to be wrapped.

Fig. 2$^B$ is a section taken substantially on the line 2$^B$—2$^B$ of Fig. 2$^A$.

Fig. 3 is a plan view of one of the stock dies adapted to fit into the feed pulley shown in Fig. 2$^A$.

Fig. 3$^A$ is an end view of the stock die shown in Fig. 3.

Figs. 3$^B$ and 3$^C$ are end views of stock dies adapted to receive stock of elliptical and rectangular cross-section, respectively.

Fig. 3$^D$ is a view in elevation of the plate bracket of the machine in which are angularly journaled certain of the wrapping wheel shafts.

Fig. 3$^E$ is a plan view of the plate bracket shown in Fig. 3$^D$.

Fig. 4 is a front elevation of the wrapping wheels detached from the machine, better to illustrate their operation.

Fig. 5 is a side elevation of the mechanism shown in Fig. 4.

Fig. 6 represents a piece of stock having a curved end and which is wrapped in accordance with my invention.

Fig. 6$^A$ illustrates a tapering piece of stock likewise wrapped in accordance with my invention.

Figs. 7, 7$^A$ and 7$^B$ are end views of frame members, i. e., stock of different shapes provided with strand wrappings.

Figure 8:
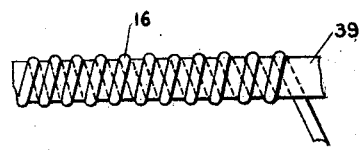
Figure 9:
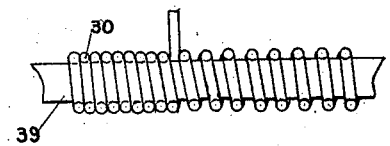

Figs. 8 and 9 are views of fragmentary parts of frame members or pieces of stock wrapped in different ways.

Figure 10:
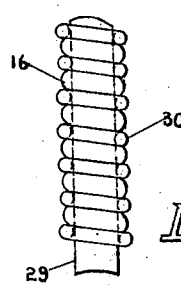
Figure 11:
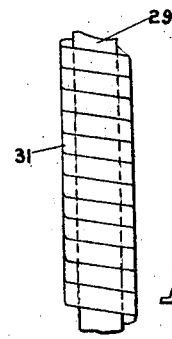
Figure 12:
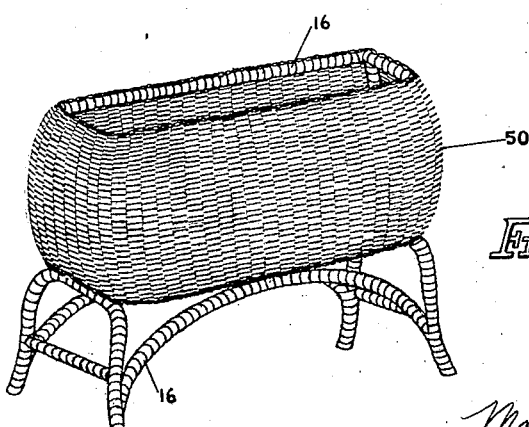

Fig. 10 is a view of a frame member or piece of stock wrapped with different shaped strands; whereas Fig. 11 illustrates a piece of stock or frame member wrapped with flat material; and Fig. 12 is a view of a reed article embodying therein a reed fabric which covers part of the frame of the article and the remaining parts of the frame of which are wrapped in accordance with the method herein disclosed and by the mechanism illustrated and described.

Instead of wrapping frame members of a reed article with the fibrous strands after or during the operation of weaving the fabric on the frame, or after it has been affixed thereto, I purposely proceed in an entirely different manner whereby a number of marked advantages are secured. That is to say, I first wrap the frame members along the desired portions, preferably before the frame members are either secured one to the other, and also preferably before the reed or reed-like fabric has been woven on or affixed to the frame of the article. In this manner the cumbersome operation of wrapping the strand in close proximity to the various other interconnected members of the frame is eliminated and the operation greatly simplified and expedited. A further important advantage resulting from this method of procedure is that it then becomes possible to perform these operations by machine instead of hand.

In other words the method of manufacture which I have devised makes possible and practicable the utilization of machines for the performance of the wrapping of the frame. The many other advantages will appear from the detailed description which I shall now give.

Referring to the drawings for this purpose the wrapping mechanism, as here shown, is mounted upon a table 1 which is supported at a convenient working height by means of the supporting legs 1'. Upstanding from the table 1, will be found a plate bracket 7, in which I have provided a plurality of holes or openings 19, 20, 21 and 23, which are spaced around a central opening 15. The hole 15 is drilled at right angles to the face of the plate or bracket 7, whereas the holes 19, 20, 21 and 23 are drilled, in the instant case, at an angle of eighty-seven degrees to the face of the plate. As is probably best shown in Fig. 3ᴱ, the holes 19 and 20 extend angularly in one direction, whereas the holes 21 and 23 extend angularly in the other direction. That is to say, if the center lines of the openings 19 and 20, and 21 and 23, respectively, were extended toward the right hand side of the bracket plate, as shown in Fig. 3, they would intersect the extended center line of the central opening 15. 11, 12 and 13 are the wrapping wheels, and, as will be observed, as here shown, they are each provided with a double groove, each groove adapted to the reception of a strand such as is to be wound upon the stock or frame member. The wrapping wheels 12 and 13 are provided with shafts or journals 19' and 21' respectively, which enter the openings 19 and 21 respectively in the plate bracket 7 and whereby they are thus mounted for rotation. The wrapping wheel 11, however, is carried upon a bracket or swinging arm 9 wherein it is journaled upon the shaft 24. The bracket 9, in turn, is carried on the shaft or journal 23' which enters and is revolubly mounted in the opening 23 of the plate bracket 7, and, as will be observed, shaft 23' likewise extends at an angle. Thus it is apparent that the wheel 11 is angularly disposed as well as the other wheels.

The wheels 12 and 13 are positively driven from the power wheel 4 through the medium of the clutch 30, power shaft 31, and bevel gear 28 fixed to the power shaft and meshing with the bevel gear 29, fixed to rotate with wrapping wheel 12. Fixed to rotate with wrapping wheels 12 and 13 will be found gear wheels 25 and 17 respectively which are interconnected by means of the idler gear 18 that is carried upon the shaft 20' which shaft 20' is journaled in the opening 20 in plate bracket 7. As a matter of safety the various gears are enclosed within a housing 7'.

It will be understood that the pulley 4 may be driven from any suitable source of power by the usual belt. By means of the lever 5, pivoted at 32 and connected at its lower end to connecting rod 6 which is operatively connected to the control pedal 2, the clutch 30 may be properly moved from operative to inoperative position and vise versa.

Having thus described the features of construction I shall now describe the operation of wrapping a piece of stock 39. A suitable quantity of the strand material to be used is carried upon the reel 26 and from thence passes to the wheel 11, passing under the reed guide 10, thence into one of the grooves in the wheel 11 and partially around the wheel to the stock or frame member 39 to which the end of the strand is secured. As indicated in Fig. 3, the straight part of the stock is first started into the machine, passing through and being supported in the central opening 15. The power is then applied and due to the angular position and arrangement of the wrapping wheels and their engagement with the stock the stock is both rotated and advanced, thus helically wrapping the strand upon the stock. Inasmuch as the wheel 11 is an idler and is intended properly to feed the strand to the stock I have provided the tortion spring 22 which tends to swing the bracket 9 downwardly and hence moves the wheel 11 toward the stock and to the operative position, probably best shown in Fig. 4 and this operation also tends to make the strand of material 16 taut due to its engagement with the guide 10. By thus mounting the wheel 11 yieldingly it may come and go as may be necessary to accommodate itself to irregularities in the stock upon which the strand is wound or wrapped. Thus the wrapping operation continues until all of the stock has been wrapped. As the curved end 39' of the stock shown in Figs. 3, 4 and 5, is approached it might appear that the wrapping operation would have to stop but this is not so for the previously wrapped straight portion of the stock merely extends outwardly and circumscribes the necessary course around the axis of the opening 15 due to its then projection at an angle somewhat as indicated by means of dotted lines in Fig. 2. When the stock has been entirely wrapped or so much thereof as is desired the strand is fixed at that point to the stock, then severed, the stock removed, and a new piece inserted to be rotated in like manner.

The wrapping operation described contemplated the wrapping of a piece of stock circular in cross-section, such as is extensively used in the manufacture of reed articles and such as is depicted in Figs. 2, 4, 6 and 7 of the drawings. My invention, however, is not in any sense limited to wrapping stock or frame members of circular cross-section. When stock of non-circular cross-section is to be wrapped, however, I prefer to provide additional means more certain to feed the stock through the device for it will be understood that when wrapping stock of non-circular cross-section, the various wrapping wheels will not engage as fully and uniformly with the stock in its passage through the machines and hence cannot be relied upon as effectively to forward and rotate the stock. For the purpose of feeding non-circular stock I prefer to provide the auxiliary mechanism, probably best shown in Fig. 2ᴬ wherein it will be observed that a pulley 34 is provided which is rotatably supported in a bracket 41. The pulley 34 is provided with a central opening for the purpose of receiving a die 37 which, in turn, is provided with the central or die opening 37' corresponding to the cross-section of the stock, which is to be rotated. The die is shown separate and apart from the pulley in Figs. 3 and 3ᴬ wherein the central opening 37' is circular, simply to illustrate that if desired the die may be used with circular stock although this is not ordinarily necessary. In Fig. 3ᴮ the die 38 which is like the die 37 except that the die opening 38' is adapted to receive stock of elliptical cross-section, whereas in Fig. 3ᶜ the die 39 has an opening 39' adapted to receive stock of square cross-section. By driving the pulley 34 as by means of a belt it is obvious that the stock will be positively rotated because of its engagement with the various wrapping wheels, which are positioned around the circumference of the stock corresponding in a sense to the lead of a screw, the stock is effectively forwarded and the strand applied.

Likewise stock which is tapering in form can be wrapped and such stock is indicated in Fig. 6ᴬ. For some purposes or for ornamental effects, it may be desired so to wrap the strand upon the stock that space will be provided between adjacent convolutions of the strand. Such a wrapping is indicated in Fig. 8 where for the matter of convenience the stock bears the same reference character 39 and the strand the reference character 16. To secure this wrapping effect it is but necessary to set the wrapping wheels 11, 12 and 13 at a more abrupt angle so as more speedily to feed the stock forward relative to its rotary movement.

In Fig. 9 is illustrated the idea that two strands may be simultaneously wrapped upon the stock in which event one strand would be provided for each of the two grooves illustrated in the wrapping wheels, thus by supplying one strand which is natural in color and another of a different color, such for instance as gray, a very novel and pleasing effect can be secured.

Fig. 10 illustrates the idea that it is possible to wrap simultaneously strands of different characters; the illustration showing one which is circular in cross-section and one which is half round.

Fig. 11 simply illustrates a piece of stock which is wrapped with flat strand material.

In Fig. 12 a completed article is illustrated wherein it will be observed that so much of the frame as is not covered by the reed or reed-like fabric 50 is covered by the wrapped strands 16 which, as before stated, are wrapped before the respective frame members are assembled.

The many advantages of my invention will be understood by those skilled in this art without further comments.

I claim:—

1. A machine of the class described embodying therein, a plurality of wrapping wheels spaced around an intermediate zone constituting the path of travel of the stock to be wrapped, the axes of rotation of said wrapping wheels being divergent with respect to the path of travel of the stock and being adapted to feed the stock forward, 2. A machine of the class described embodying therein a guide for the stock to be wrapped, and a plurality of wrapping wheels spaced around the guide, said wheels being mounted for rotation upon axes that are divergent with respect to the axis of the stock guide.

3. A machine of the class described embodying therein, a plurality of wrapping wheels spaced around an intermediate zone constituting the path of travel of the stock to be wrapped, the axes of rotation of said wrapping wheels being divergent with respect to the path of travel of the stock, and each wheel being provided with a grooved periphery.

4. A machine of the class described embodying therein a guide for the stock to be wrapped, a plurality of wrapping wheels spaced around the guide, said wheels being mounted for rotation upon axes that are divergent with respect to the axis of the stock guide and being thereby adapted to feed the stock forward, and each wheel being provided with a grooved periphery.

5. A machine of the class described embodying therein, a plurality of wrapping wheels spaced around an intermediate zone constituting the path of travel of the stock to be wrapped, the axes of rotation of said wrapping wheels being divergent with respect to the path of travel of the stock, and each wheel being provided with a plurality of grooves on its periphery.

6. A machine of the class described embodying therein a guide for the stock to be wrapped, a plurality of wrapping wheels spaced around the guide, said wheels being mounted for rotation upon axes that are divergent with respect to the axis of the stock guide, and each wheel being provided with a plurality of grooves on its periphery.

7. A machine of the class described embodying therein, a plurality of wrapping wheels spaced around an intermediate zone constituting the path of travel of the stock to be wrapped, the axes of rotation of said wrapping wheels being divergent with respect to the path of travel of the stock, one of said wheels being mounted for swinging movement to and from the other wheels.

8. A machine of the class described embodying therein a guide for the stock to be wrapped, and a plurality of wrapping wheels spaced around the guide, said wheels being mounted for rotation upon axes that are divergent with respect to the axis of the stock guide, one of said wheels being mounted for swinging movement to and from the other wheels.

9. A machine of the class described embodying therein, a plurality of wrapping wheels spaced around an intermediate zone constituting the path of travel of the stock to be wrapped, the axes of rotation of said wrapping wheels being divergent with respect to the path of travel of the stock, and means yieldingly holding at least one of said wheels in operative position.

10. A machine of the class described embodying therein a guide for the stock to be wrapped, and a plurality of wrapping wheels spaced around the guide, said wheels being mounted for rotation upon axes that are divergent with respect to the axis of the stock guide, and means yieldingly holding at least one of said wheels in operative position.

11. A machine of the class described embodying therein, a plurality of wrapping wheels spaced around an intermediate zone constituting the path of travel of the stock to be wrapped, the axes of rotation of said wrapping wheels being divergent with respect to the path of travel of the stock, one of said wheels being mounted for swinging movement to and from the other wheels, and means yieldingly holding said swingably mounted wheel in operative position.

12. A machine of the class described embodying therein, a plurality of wrapping wheels spaced around an intermediate zone constituting the path of travel of the stock to be wrapped, the axes of rotation of said wrapping wheels being divergent with respect to the path of travel of the stock, and being thereby adapted to feed the stock forward, and means for driving certain of said wheels.

13. A machine of the class described embodying therein, a plurality of wrapping wheels spaced around an intermediate zone constituting the path of travel of the stock to be wrapped, the axes of rotation of said wrapping wheel being divergent with respect to the path of travel of the stock, one of said wheels being mounted for swinging movement to and from the other wheels, and means for driving the wheels that are not swingably mounted.

14. A machine of the class described embodying therein, a plurailty of wrapping wheels spaced around an intermediate zone constituting the path of travel of the stock to be wrapped, the axes of rotation of said wrapping wheels being divergent with respect to the path of travel of the stock, and a rotatable guide for feeding stock to the wrapping wheels.

15. A machine of the class described embodying therein, a plurality of wrapping wheels spaced around an intermediate zone constituting the path of travel of the stock to be wrapped, the axes of rotation of said wrapping wheels being divergent with respect to the path of travel of the stock, and a rotatable guide for feeding stock to the wrapping wheels, said guide having an opening similar to the shape of the stock to be wrapped.

16. A machine of the class described embodying therein, a plurality of wrapping wheels spaced around an intermediate zone constituting the path of travel of the stock to be wrapped, the axes of rotation of said wrapping wheels being divergent with respect to the path of travel of the stock, and a strand guide adjacent one of said wheels.

17. A device of the class described embodying therein, a plate bracket having an opening therein for the passage of stock therethrough, and a plurality of wrapping wheels rotatably carried by said plate bracket, being spaced around the opening and the axes of rotation thereof being divergent with respect to the axis of said stock opening and being thereby adapted to feed the stock forward.

18. A device of the class described embodying therein, a plate bracket having an opening therein for the passage of stock therethrough, and a plurality of wrapping wheels rotatably carried by said plate bracket, being spaced around said opening and the axes of rotation thereof being divergent with respect to the axis of said stock opening, and means yieldingly holding one of said wheels in operative position.

19. A device of the class described embodying therein, a plate bracket having an opening therein for the passage of stock therethrough, and a plurality of wrapping wheels rotatably carried by said plate bracket, being spaced around said opening and the axes of rotation thereof being divergent with respect to the axis of said stock opening, and a swingable arm upon which one of said wheels is mounted.

20. A device of the class described embodying therein, a plate bracket having an opening therein for the passage of stock therethrough, and a plurality of wrapping wheels rotatably carried by said plate bracket, being spaced around said opening and the axes of rotation thereof being divergent with respect to the axis of said stock opening, and a swingable arm upon which one of said wheels is mounted, and a spring for swinging said arm toward the projected axis of said stock opening.

21. A device of the class described embodying therein a plate bracket having an opening therein for the passage of stock therethrough, a plurality of wrapping wheels rotatably carried by said plate bracket, being spaced around said opening and the axes of rotation thereof being divergent with respect to the axis of said stock opening, and means for driving certain of said wheels.

22. A device of the class described embodying therein, a plate bracket having an opening therein for the passage of stock therethrough, and a plurality of wrapping wheels rotatably carried by said plate bracket, being spaced around said opening and the axes of rotation thereof being divergent with respect to the axis of said stock opening, and means yieldingly holding one of said wheels in operative position, and means for driving the wheels that are not yieldingly held.

23. A device of the class described embodying therein, a plate bracket having an opening therein for the passage of stock therethrough, and a plurality of wrapping wheels rotatably carried by said plate bracket, being spaced around said opening and the axes of rotation thereof being divergent with respect to the axis of said stock opening, a swingable arm upon which one of said wheels is mounted, and means for driving all of the wheels except the one carried upon said swinging arm.

24. A device of the class described embodying therein, a plate bracket having an opening therein for the passage of stock therethrough, and a plurality of wrapping and stock forwarding wheels, rotatably carried by said plate bracket, being spaced around said opening and the axes of rotation thereof being divergent with respect to the axis of said stock opening and being thereby adapted to feed the stock forward.

25. A device of the class described embodying therein, a plate bracket having an opening therein for the passage of stock therethrough, and a plurality of wrapping wheels rotatably carried by said plate bracket, being spaced around said opening, and the axes of rotation thereof being divergent with respect to the axis of said stock opening, said wheels having a plurality of grooves in their peripheries.

26. A machine of the class described embodying therein a plurality of wrapping wheels spaced around an intermediate zone constituting the path of travel of the stock to be wrapped, said wheels being positioned and adapted to engage the stock and thereby forward it.

27. A machine of the class described embodying therein stock rotating means and a wheel for wrapping a strand upon the stock, said wheel being adapted to engage the stock and feed it forward as well.

28. A machine of the class described embodying therein stock rotating means including a die adapted to engage the stock, and means for wrapping a strand upon the stock.

In testimony whereof, I have hereunto set my hand, this 20th day of June, 1921.

MARSHALL B. LLOYD.